US012809184B2

(12) United States Patent
Sugiyama et al.

(10) Patent No.: US 12,809,184 B2
(45) Date of Patent: Nov. 24, 2026

(54) DISPLAY DEVICE

(71) Applicant: Panasonic Automotive Systems Co., Ltd., Kanagawa (JP)

(72) Inventors: Keiji Sugiyama, Kyoto (JP); Hiroaki Okayama, Nara (JP); Satoshi Kuzuhara, Osaka (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 265 days.

(21) Appl. No.: 18/743,617

(22) Filed: Jun. 14, 2024

(65) Prior Publication Data

US 2024/0329413 A1 Oct. 3, 2024

Related U.S. Application Data

(63) Continuation of application No. PCT/JP2022/043094, filed on Nov. 22, 2022.

(30) Foreign Application Priority Data

Dec. 27, 2021 (JP) ................................ 2021-212545

(51) Int. Cl.
*G02B 27/01* (2006.01)
*B60K 35/22* (2024.01)
(Continued)

(52) U.S. Cl.
CPC .......... *G02B 27/0179* (2013.01); *B60K 35/22* (2024.01); *B60K 35/53* (2024.01);
(Continued)

(58) Field of Classification Search
CPC .................... G02B 27/0149; G02B 2027/0154
See application file for complete search history.

(56) References Cited

U.S. PATENT DOCUMENTS

2002/0012173 A1* 1/2002 Aoki ................. G02B 27/0149 359/627

FOREIGN PATENT DOCUMENTS

| | | |
|---|---|---|
| JP | 2002-052955 | 2/2002 |
| JP | 2021-107164 | 7/2021 |
| WO | 2014/171280 | 10/2014 |

OTHER PUBLICATIONS

Official communication in Japanese patent application 2021-212545 dated Oct. 29, 2024, along with English Translation thereof.

(Continued)

*Primary Examiner* — Joseph P Martinez
(74) *Attorney, Agent, or Firm* — Greenblum & Bernstein, P.L.C.

(57) ABSTRACT

In a display device, an opening portion includes a first edge portion on a forward side and a second edge portion on a backward side of the opening portion in a traveling direction of a mobile object. When the display device is mounted on the mobile object, a line connecting an upper end of the first edge portion and a lower end of the second edge portion is taken as a reference line, and outside light that passes along the reference line and enters a light-transmissive member is taken as reference outside light, the reference outside light for the case where the opening portion is in a first position arrives at a lower position, at least partially in an optical path after the reference outside light is reflected at the light-transmissive member, than the reference outside light for the case where the opening portion is in the second position.

9 Claims, 8 Drawing Sheets

(51) Int. Cl.
*B60K 35/53* (2024.01)
*B60K 35/80* (2024.01)
*B60K 37/00* (2006.01)
*B60K 35/231* (2024.01)
*B60K 35/60* (2024.01)
*B60K 35/90* (2024.01)

(52) U.S. Cl.
CPC .............. *B60K 35/80* (2024.01); *B60K 37/00* (2013.01); *G02B 27/0101* (2013.01); *B60K 35/231* (2024.01); *B60K 35/60* (2024.01); *B60K 35/90* (2024.01); *G02B 2027/0187* (2013.01)

(56) References Cited

OTHER PUBLICATIONS

Official Communication issued in International Patent Application No. PCT/JP2022/043094, dated Feb. 14, 2023, along with an English translation thereof.

* cited by examiner

DISPLAY DEVICE

CROSS REFERENCE TO RELATED APPLICATIONS

This is a continuation application of PCT International Application No. PCT/JP2022/043094 filed on Nov. 22, 2022, designating the United States of America, which is based on and claims priority of Japanese Patent Application No. 2021-212545 filed on Dec. 27, 2021.

FIELD

The present disclosure relates to a display device.

BACKGROUND

Patent Literature (PTL) 1 discloses a head-up display with improved appearance and design. Such head-up display includes: an adjuster that adjusts a projection direction of a projector; a lid portion that includes a bezel on the forward side and a bezel on the backward side, and an opening which is movably located in the opening portion in the front-back direction of a vehicle and through which a display image transmits; and a controller that causes the lid portion to move in accordance with the projection direction.

CITATION LIST

Patent Literature

PTL 1: WO2014/171280

SUMMARY

However, the head-up display according to PTL 1 described above can be improved upon.

In view of this, the present disclosure provides a display device capable of improving upon the above related art.

The display device according to an aspect of the present disclosure is a display device that projects an image onto a display medium of a mobile object for a user to view a virtual image. Such display device includes: an image generator that generates the image and outputs image light representing the image to project the image onto the display medium; a light-transmissive member that is located in an optical path of the image light outputted, between the display medium and the image generator; and an opening portion in which an opening is located and which is disposed movably between a first position and a second position in a traveling direction of the mobile object, the second position being located farther backward in the traveling direction of the mobile object than the first position, wherein the opening portion includes a first edge portion located on a forward side of the opening portion in the traveling direction of the mobile object and a second edge portion located on a backward side of the opening portion in the traveling direction of the mobile object, and when the display device is mounted on the mobile object, a line connecting an upper end of the first edge portion and a lower end of the second edge portion is taken as a reference line, and outside light that passes along the reference and line enters the light-transmissive member is taken as reference outside light, the reference outside light for a case where the opening portion is in the first position arrives at a lower position, at least in part of the optical path after the reference outside light is reflected at the light-transmissive member, than the reference outside light for a case where the opening portion is in the second position.

Note that some of these specific aspects may be implemented using a system, a method, an integrated circuit, a computer program, or a recording medium such as a computer-readable CD-ROM, or any combination of systems, methods, integrated circuits, computer programs, or recording media.

The display device of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1A:
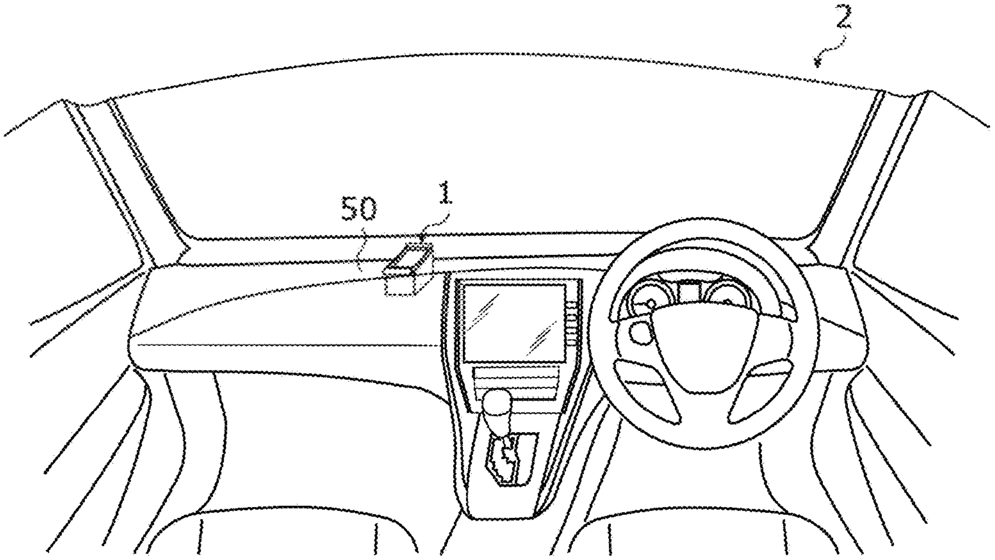
FIG. 1A is a diagram showing a vehicle and a display device according to Embodiment 1.

Each of the exemplary embodiments described below shows a general or specific example. The numerical values, shapes, materials, elements, the arrangement and connection of the elements, steps, the processing order of the steps, etc. shown in the following exemplary embodiments are mere examples, and thus do not limit the scope of the present disclosure. Therefore, among the elements in the following exemplary embodiments, those not recited in any one of the independent claims are described as optional elements. Also, the details of the embodiments can be combined with each other in all of the embodiments.

Also, the drawings are schematic views, and are not always strictly drawn. In the drawings, the same referential sings are given to the same elements. Also, the following embodiments use expressions such as "substantially agree". The expression "substantially agree" means, for example, not only perfect agreement with something, but also approximate agreement with something, that is, an error on the order of a few percent, for example, is included. Also, the expression "substantially agree" means agreement with something in a range in which the effects of the present disclosure is achievable. The same is applicable to other expressions using the term "substantially".

Figure 1B:
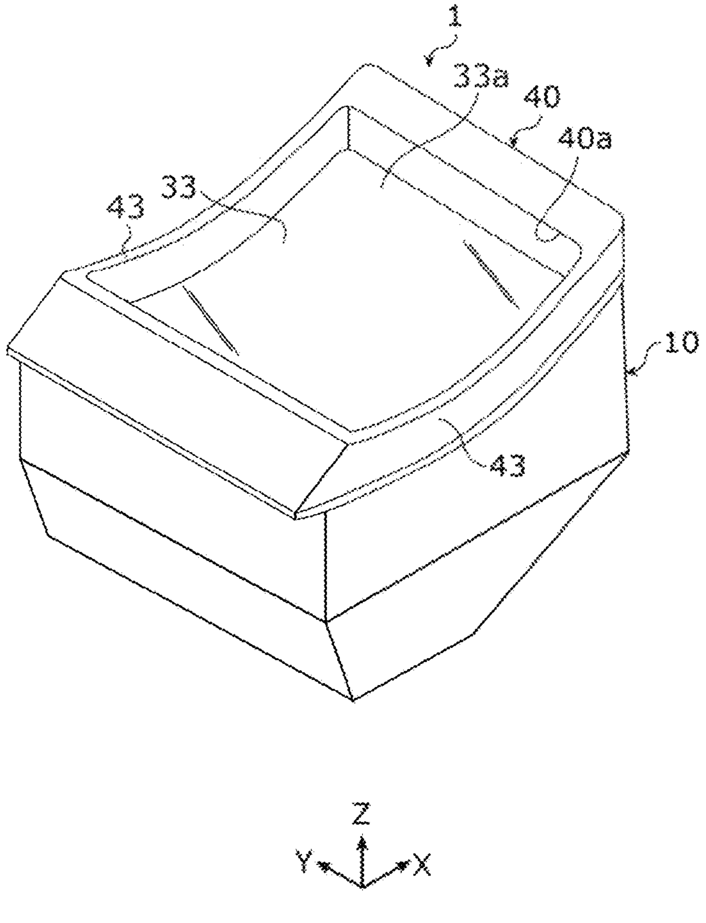
FIG. 1B is a perspective view showing the display device according to Embodiment 1.

Also, directions used in the following embodiments are taken as follows: the second edge portion side with respect to the first edge portion is the positive direction of the X-axis (also referred to as "positive X direction"); the opening portion side with respect to the first housing is the positive direction of the Z-axis (also referred to as "positive Z direction"); and the direction that is vertical to the positive X direction and the positive Z direction and that is on the left side of FIG. 1B is the positive direction of the Y-axis (also referred to as "positive Y direction"). The directions used in FIG. 1B are applied to FIG. 2 and the subsequent drawings.

Hereinafter, the display system of the present disclosure is described in greater detail with reference to the accompanying Drawings.

Embodiment 1

<Configuration>

Figure 2:
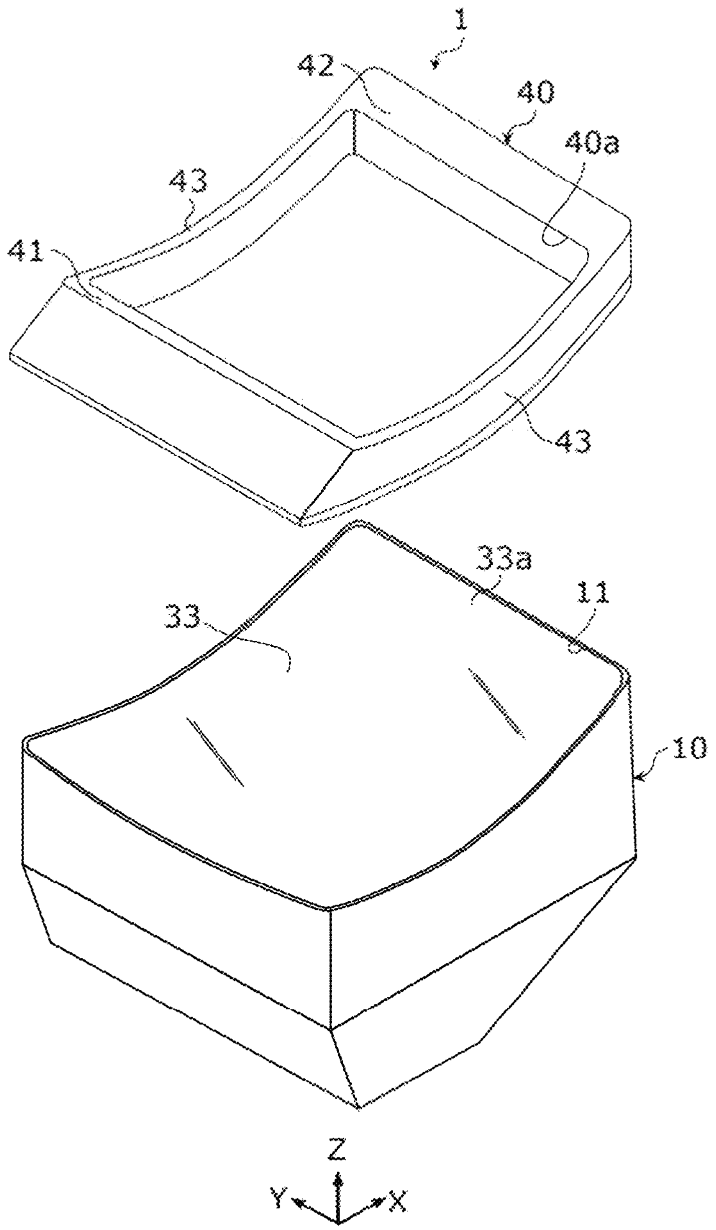
FIG. 2 is an exploded perspective view showing the display device according to Embodiment 1.

FIG. 1A is a diagram showing vehicle 2 and display device 1 according to Embodiment 1. FIG. 1B is a perspective view showing display device 1 according to Embodiment 1. FIG. 2 is an exploded perspective view showing display device 1 according to Embodiment 1.

As shown in FIG. 1A, FIG. 1B, and FIG. 2, display device 1 is disposed, for example, on the dashboard (also called "instrument panel") of vehicle 2. Front window 3 (also called "front shield") is disposed above the dashboard of vehicle 2. Display device 1 is disposed between the dashboard and front window 3.

Here, front window 3 is an example of the display medium. Vehicle 2 is an example of the mobile object. Note that the mobile object may also be an aircraft, a ship, etc. in addition to being vehicle 2.

Display device 1 causes image light that represents an image emitted from image generator 20 to be reflected at front window 3, thereby displaying, to a user who is the driver, a passenger, etc., a virtual image that corresponds to the image represented by the image light. Stated differently, display device 1 projects the image light that constitutes the image emitted by image generator 20 in the forward direction of front window 3, thereby displaying, on front window 3, the image represented by the image light. With this, display device 1 projects the image onto front window 3 of vehicle 2 for the user to view the virtual image.

Here, the image light is light that represents information of the image including a numeric character, a text, graphics, etc., and is displayed in the forward direction of front window 3 as a virtual image. The image is a still image or a moving image, and an image of a numeric character, a text, graphics, etc.

Figure 3:
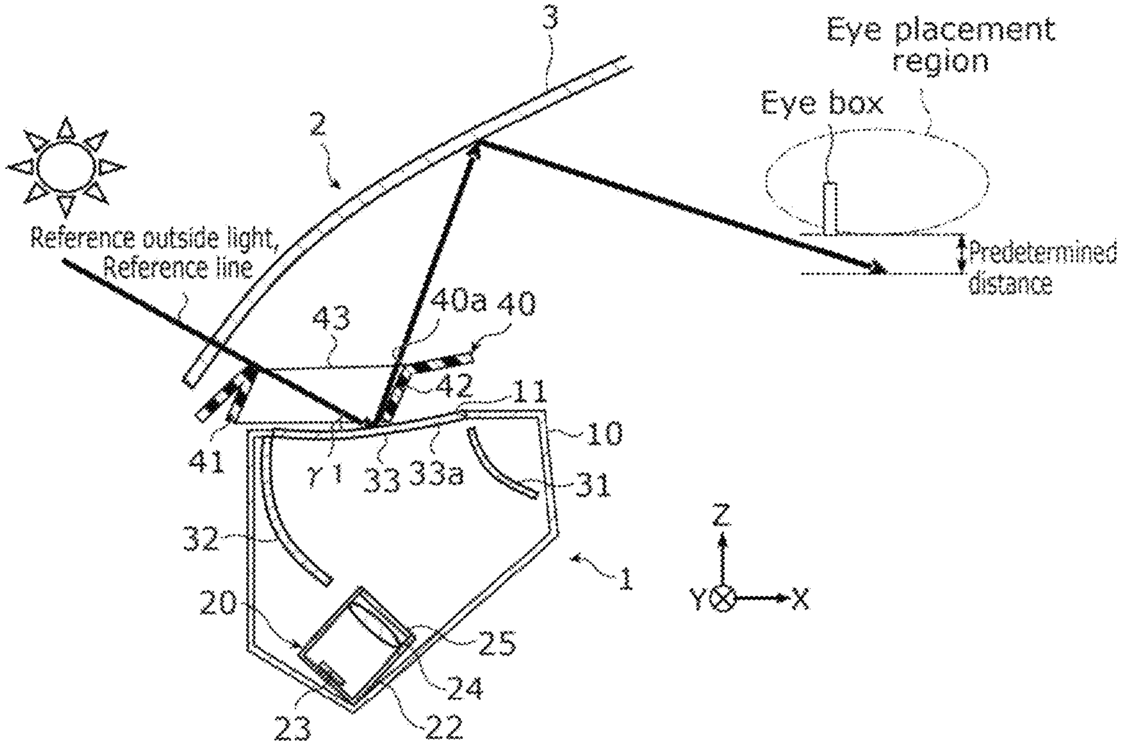
FIG. 3 is a cross-sectional view showing the internal configuration of the display device according to Embodiment 1 and a front window, when an opening portion of the display device is in a first position.
Figure 4A:
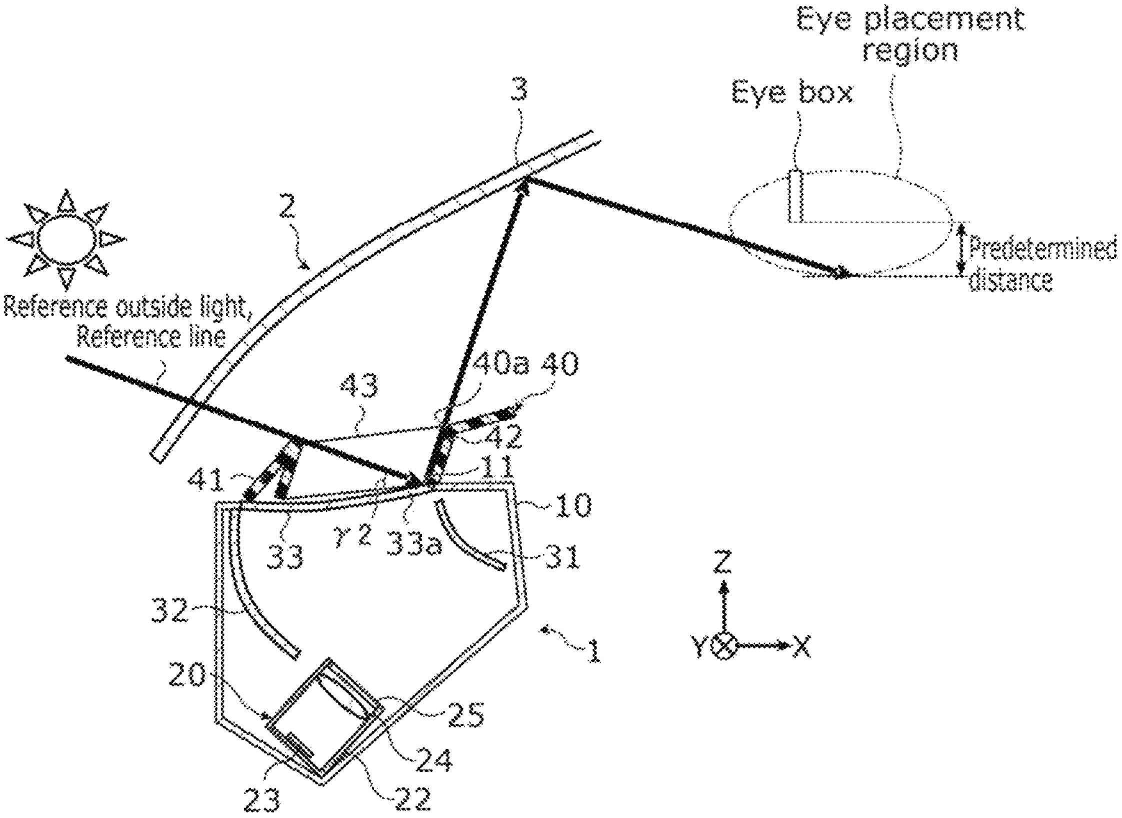
FIG. 4A is a cross-sectional view showing the internal configuration of the display device according to Embodiment 1 and the front window, when the opening portion of the display device is in a second position.

FIG. 3 is a cross-sectional view showing the internal configuration of display device 1 according to Embodiment 1 and front window 3, when opening portion 40 of display device 1 is in a first position. FIG. 4A is a cross-sectional view showing the internal configuration of display device 1 according to Embodiment 1 and front window 3, when opening portion 40 of display device 1 is in a second position.

As shown in FIG. 3 and FIG. 4A, display device 1 includes first housing 10, image generator 20, first reflection mirror 31, second reflection mirror 32, light-transmissive member 33, and opening portion 40.

[First Housing 10]

First housing 10 is a hosing that houses image generator 20 and light-transmissive member 33. First housing 10 constitutes the outer envelope of display device 1. First housing is fixed to vehicle 2 in a state that first housing 10 is attached to the dashboard.

Housing opening 11 on which light-transmissive member 33 is disposed is located on the positive Z direction side of first housing 10. The positive X direction side of housing opening 11 is curved upwards toward the positive Z direction to fit the shape of light-transmissive member 33 that is curved. Stated differently, the positive X direction side of first housing 10 partially extends toward the positive Z direction.

[Image Generator 20]

Image generator 20 generates an image and outputs image light that represents the generated image to project the image onto front window 3. More specifically, image generator 20 emits the image light from display 25. The image light emitted from display 25 of image generator 20 is reflected at first reflection mirror 31, and then at second reflection mirror 32. Such reflected image light then enters and transmits through light-transmissive member 33, and then passes through the opening of opening portion 40 to be emitted from display device 1 and projected onto front window 3. Stated differently, image generator 20 emits the image light that represents the image, thereby projecting a predetermined image onto front window 3. The user is able to view a virtual image by means of the image light reflected at front window 3. Image generator 20 is, for example, a liquid crystal display (LCD) device that includes an LCD, and so forth.

Image generator 20 includes display 25, second housing 22, light-emitting module 23, and collective lens 24.

Display 25 is a device such as an LCD device. Examples of display 25 include a transmissive or transflective thin film transistor (TFT) liquid crystal display. Display 25 is irradiated with light from the back surface side, and the light-outputting surface emits light by means of the light that has transmitted therethrough. Display 25 causes the image light that represents the image including a numeric character, a text, graphics, etc. to be emitted from the light-outputting surface, in accordance with a control instruction from a controller mounted on vehicle 2 shown in FIG. 1A. Display 25 is driven by means of alternating-current power obtained from vehicle 2 side.

The optical axis of display 25 is an optical axis that lies in the direction parallel to a prescribed direction. In the present embodiment, the optical axis is inclined upwards, with respect to the positive X direction, toward the positive Z direction.

Display 25 is also inclined with respect to the plane that is orthogonal to the optical axis of light-emitting module 23. More specifically, display 25 is fixed to second housing 22 to be orthogonal to the optical axis.

Second housing 22 is a housing that houses light-emitting module 23, collective lens 24, etc. Second housing 22 is disposed at the bottom plate portion of first housing 10. Second housing 22 is fixed to the bottom portion of first housing 10, using, for example, a securing member such as a screw.

Light-emitting module 23 includes a light source and a substrate. Light-emitting module 23 is an example of the projector.

The light source is mounted on the substrate in an orientation in which the light source emits light toward display 25 from the back side of display 25 via collective lens 24. The light source includes, for example, a light-emitting diode (LED). The light source is driven, for example, by means of direct-current power obtained from the power source (not illustrated) of vehicle 2. The light source turns ON or OFF in response to an ON signal or an OFF signal from the controller.

The light source is mounted on the surface of the substrate that faces collective lens 24 and display 25. The substrate is supported by second housing 22 in an orientation in which the substrate is inclined downwards, with respect to the Z-Y plane, toward the positive X direction.

Collective lens 24 is disposed on the light emission direction side of the light source that is in the optical path between the light source and display 25. In the present embodiment, collective lens 24 is supported by second housing 22 in an orientation in which the central axis of collective lens 24 substantially agrees with the optical axis of the light source.

Collective lens 24 is a collective lens that emits light from the light source toward display 25. The light emitted from collective lens 24 illuminates the entirety of the back surface of display 25.

Collective lens 24 is formed of a member having light-transmission properties, such as glass, transparent resin, etc. In the present embodiment, collective lens 24 is a convex lens. Note that collective lens 24 may also be a concave lens.

[First Reflection Mirror 31 and Second Reflection Mirror 32]

First reflection mirror 31 reflects the image light emitted by image generator 20, toward second reflection mirror 32. Second reflection mirror 32 reflects the image light emitted by image generator 20, toward light-transmissive member 33.

More specifically, first reflection mirror 31 and second reflection mirror 32 are disposed in first housing 10, facing each other with a predetermined distance therebetween.

Even more specifically, first reflection mirror 31 is disposed on the positive X direction side of first housing 10 to face the light-outputting surface of image generator 20 that is disposed on the negative direction side of the X-axis (hereinafter also referred to as "negative X direction") of first housing 10. Also, first reflection mirror 31 is disposed farther in the positive Z direction than image generator 20. Second reflection mirror 32 is disposed on the negative X direction side of first housing 10 to face first reflection mirror 31 that is disposed on the positive X direction side of first housing 10. Stated differently, second reflection mirror 32 and first reflection mirror 31 are arranged in a line along the X-axis direction. Also, second reflection mirror 32 is disposed in the Z-axis direction farther in the positive Z direction than image generator 20.

Stated differently, first reflection mirror 31 and second reflection mirror 32 are disposed in the Z-axis direction, between image generator 20 and light-transmissive member 33.

As described above, first reflection mirror 31 and second reflection mirror 32 are disposed in first housing 10, and thus the image light emitted by image generator 20 enters and is reflected at first reflection mirror 31, and then enters and is reflected at second reflection mirror 32 to enter light-transmissive member 33. Stated differently, first reflection mirror 31 is disposed in the optical path between image generator 20 and second reflection mirror 32, and second reflection mirror 32 is disposed in the optical path between first reflection mirror 31 and light-transmissive member 33.

After that, the image light that enters light-transmissive member 33 transmits through light-transmissive member 33, and the image is projected onto front window 3.

First reflection mirror 31 and second reflection mirror 32 are convex mirrors or concave mirrors. In the present embodiment, first reflection mirror 31 and second reflection mirror 32 are curved concave mirrors. Also, in the present embodiment, first reflection mirror 31 and second reflection mirror 32 are rectangular mirrors that are elongated in the Z-axis direction. Note that first reflection mirror 31 and second reflection mirror 32 are not limited to having a specific shape, and thus may have a polygonal shape and a circular shape.

Also, second reflection mirror 32 may be capable of moving about the Y-axis direction serving as the axis center. In this case, the position of the image to be projected onto front window 3 is adjustable. Second reflection mirror 32 may also be capable of moving in response to a manual operation or an electrical operation performed by the drive mechanism.

[Light-Transmissive Member 33]

Light-transmissive member 33 is a thin plate that is curved at least in part. Light-transmissive member 33 has light-transmission properties. For this reason, the image light that has transmitted through light-transmissive member 33 is projected onto front window 3.

Light-transmissive member 33 is fixed to first housing 10 to cover (close) housing opening 11 of first housing 10. Also, light-transmissive member 33 is disposed on the positive Z direction side of second reflection mirror 32 in an orientation in which light-transmissive member 33 is substantially parallel to the X-Y plane. Stated differently, light-transmissive member 33 is located in the optical path of the image light between front window 3 and image generator 20. More specifically, light-transmissive member 33 is disposed in the optical path located between second reflection mirror 32 and front window 3. For this reason, light-transmissive member 33 is capable of letting the image light emitted by image generator 20 to transmit through light-transmissive member 33 toward front window 3.

Light-transmissive member 33 also serves as an antifouling cover that prevents the entry of dust and dirt into first housing 10. The outer surface of light-transmissive member 33 on front window 3 side may be hard-coat treated. In this case, dust and dirt on such outer surface are easily wiped off. The outer surface of light-transmissive member 33 on front window 3 side is a surface of light-transmissive member 33 on the positive X direction side and is a light-outputting surface from which the image light is emitted.

Light-transmissive member 33 also has curved portion 33*a* that is curved upwards toward the opposite direction of the traveling direction. Stated differently, the positive X direction side of housing opening 11 extends towards the positive Z direction, and thus the positive X direction side of light-transmissive member 33 is curved upwards toward the positive Z direction to fit the shape of housing opening 11. Curved portion 33*a* has an arc shape in a cross-sectional view.

Light-transmissive member 33 may be curved either wholly or in part. In the case where light-transmissive member 33 is curved in part, light-transmissive member 33 may have not only curved portion 33*a*, but also a flat portion located on the negative X direction side of curved portion 33*a*.

[Opening Portion 40]

Opening portion 40 is a frame body in which opening 40*a* is located. The image light that transmits through light-transmissive member 33 passes through opening 40*a*. Also, outside light that enters from outside of front window 3 and outside light that is reflected at light-transmissive member 33 pass through opening 40*a*.

Opening portion 40 is located on front window 3 side of light-transmissive member 33 to cover light-transmissive member 33. Stated differently, opening 40*a* is disposed in a position that faces light-transmissive member 33. Also, opening 40*a* is disposed to overlap light-transmissive member 33 at least partially along the Z-axis direction.

Opening portion 40 is movably disposed along the traveling direction of vehicle 2 between the first position and the second position that is located farther backward in the traveling direction of vehicle 2 than the first position. Stated differently, opening portion 40 is movable along the X-axis direction between the first position located on the negative X direction side with respect to light-transmissive member 33 and the second position located on the positive X direction side with respect to light-transmissive member 33. In the present embodiment, when opening portion 40 is in the first position, opening 40*a* is disposed not to overlap curved portion 33*a* of light-transmissive member 33 in the Z-axis direction. Meanwhile, when opening portion 40 is in the second position, opening 40*a* is disposed to overlap curved portion 33*a* of light-transmissive member 33 in the Z-axis direction.

When opening portion 40 has moved from the first position to the second position, such movement is along the outer surface of light-transmissive member 33. As such, second edge portion 42 of opening portion 40 may rise up to be higher than first edge portion 41. Stated differently, opening portion 40 that has moved to the second position is in an orientation in which second edge portion 42 is located higher than first edge portion 41. Meanwhile, when opening portion 40 has moved from the second position to the first position, such movement is along the outer surface of light-transmissive member 33. As such, first edge portion 41 and second edge portion 42 of opening portion 40 may be equal in height. Stated differently, opening portion 40 that has moved to the first position may be in an orientation in which first edge portion 41 and second edge portion 42 are in a line along the X-Y plane.

When housing opening 11 of first housing 10 is in size with which housing opening 11 can be inserted into opening 40*a* of opening portion 40, opening portion 40 may be in an orientation in which first edge portion 41 and second edge portion 42 are arranged in a line along the X-Y plane, regardless of whether in the first position or the second position.

Opening portion 40 may be capable of moving in response to a manual operation. Opening portion 40 may also be capable of being moved by means of the drive mechanism such as an electrical motor, a gear, a belt, etc. In this case, opening portion 40 may be subjected to an input operation performed by an input device mounted on vehicle 2. Opening portion 40 may also be subjected to a drive control performed by means of the drive mechanism and the controller that controls the drive mechanism in response to a sensor mounted on the vehicle detecting the user's eye position. Stated differently, the controller may control the drive mechanism to cause opening portion 40 to move, in response to the sensor detecting the user's eye position. With this, it is possible for opening portion 40 to automatically move in conjunction with the user's eye position. Note that the controller is, for example, a processor that is capable of executing a program.

Opening portion 40 as described above includes first edge portion 41, second edge portion 42, and a pair of third edge portions 43.

First edge portion 41 is disposed on the forward side of opening portion 40 in the traveling direction of the mobile object to face second edge portion 42, that is, farther in the negative X direction than second edge portion 42. First edge portion 41 is movable along the X-axis direction together with the movement of opening portion 40.

First edge portion 41 extends in the positive Z direction to rise upwards with respect to light-transmissive member 33. The tip of first edge portion 41 is located higher than light-transmissive member 33. More specifically, the tip of first edge portion 41 is located higher than curved portion 33*a*. This configuration enables first edge portion 41 to block outside light. Stated differently, opening portion 40 has light-blocking properties.

Second edge portion 42 is disposed on the backward side of opening portion 40 in the traveling direction of vehicle 2, that is, farther in the positive X direction than first edge portion 41. Second edge portion 42 is movable along the X-axis direction together with the movement of opening portion 40.

Each of a pair of third edge portions 43 is disposed at the both ends of first edge portion 41 and second edge portion 42, and connected to first edge portion 41 and second edge portion 42.

In the present embodiment, in the case where display device 1 is mounted on vehicle 2, a line that connects the upper end of first edge portion 41 and the lower end of second edge portion 42 is taken as a reference line. Also, in the present embodiment, outside light that passes along the reference line and enters light-transmissive member 33 is taken as reference outside light. In this case, angle $\gamma 1$ of an acute angle formed by light-transmissive member 33 and the reference line for the case where opening portion 40 is in the first position may be greater than angle $\gamma 2$ of an acute angle formed by light-transmissive member 33 and the reference line for the case where opening portion 40 is in the second position.

Figure 4B:
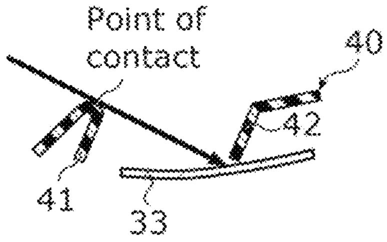
FIG. 4B is a diagram for explaining an upper end of a first edge portion.
Figure 4C:
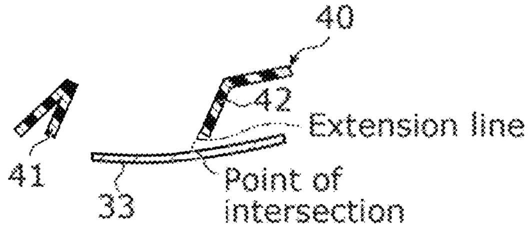
FIG. 4C is a diagram for explaining a lower end of a second edge portion.

Here, the upper end of first edge portion 41 and the lower end of second edge portion 42 are described. FIG. 4B is a diagram for explaining the upper end of first edge portion 41. FIG. 4C is a diagram for explaining the lower end of second edge portion 42. Note that FIG. 4B and FIG. 4C show only cross sections of first edge portion 41, second edge portion 42, and light-transmissive member 33.

The upper end of first edge portion 41 is, but not limited to, the vertically upper end portion of first edge portion 41. As shown in FIG. 4B, when the upper end of first edge portion 41 is in a curved shape, a line that includes the lower end of second edge portion 42 and contacts first edge portion 41 serves as the reference line. In this case, a point of contact on first edge portion 41 that is tangent to the line may also be taken as the upper end of first edge portion 41.

The lower end of second edge portion 42 is, but not limited to, the vertically lower end portion of second edge portion 42. As shown in FIG. 4C, when second edge portion 42 of opening portion 40 is not in contact with light-transmissive member 33, that is, when a gap is present between second edge portion 42 and light-transmissive member 33, a point of intersection of light-transmissive member 33 and the extension line indicated by the dash-dot-dot line which extends along a wall surface of second edge portion 42 may be taken as the lower end of second edge portion 42.

When opening portion 40 is in the first position, the reference outside light arrives at a position that is lower than the eye box by a predetermined distance, even when the eye box is in a high position in the eye placement position. Meanwhile, when opening portion 40 is in the second position, the reference outside light arrives at a position that is lower than the eye box by a predetermined distance, even when the eye box is located in a low position in the eye placement position.

Also, the reference outside light for the case where opening portion 40 is in the first position arrives at a lower position than the reference outside light for the case where opening portion 40 is in the second position, at least in part of the optical path after the reference outside light is reflected at light-transmissive member 33. In the present embodiment, the reference outside light for the case where opening portion 40 is in the first position arrives at a lower position than the reference outside light for the case where opening portion 40 is in the second position after the reference outside light is reflected at front window 3. More specifically, the reference outside light for the case where opening portion 40 is in the first position arrives at a lower position in the user position than the reference outside light for the case where opening portion 40 is in the second position. As described above, by moving the position of opening portion 40, it is possible to optimize the arrival position of the reference outside light that arrives at the user, in accordance with the user's eye position.

The following describes a math formula for causing the reference outside light to arrive at a low position in the user position.

Figure 5:
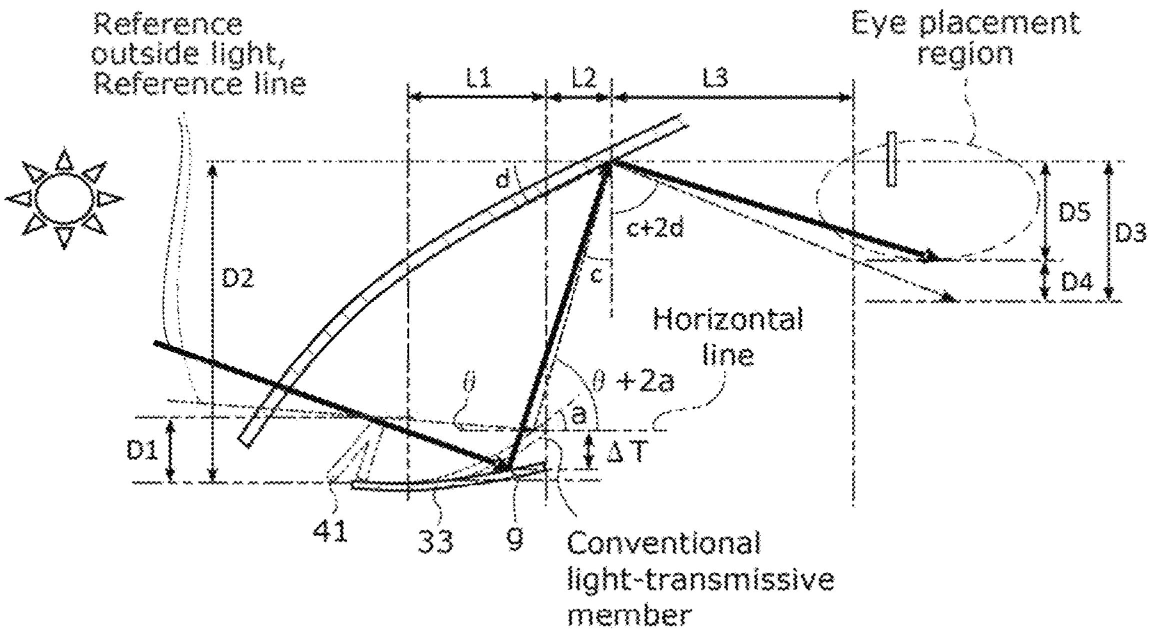
FIG. 5 is a diagram showing the position at which outside light arrives when a conventional light-transmissive member is used and the position at which outside light arrives when a light-transmissive member of the present embodiment is used.

FIG. 5 is a diagram showing the arrival position of outside light when a conventional light-transmissive member is used and the arrival position of outside light when light-transmissive member 33 of the present embodiment is used. FIG. 5 shows an example case where the opening portion is in the second position. In FIG. 5, the second edge portion, the first housing, etc. are not shown. The reference outside light that enters light-transmissive member 33 of the present embodiment is indicated by a solid line, the conventional light-transmissive member is indicated by a dash-dot-dot line, and the reference outside light that enters the conventional light-transmissive member is indicated by a dash-dot-dot line.

In FIG. 5, the height from the horizontal line that passes the end edge of the outer surface of light-transmissive member 33 on first edge portion 41 side to the tip of first edge portion 41 is indicated as "D1", the height from the horizontal line to the point from which the reference outside light indicated by the solid line enters the internal surface of front window 3 (the surface on the vehicle chamber side) is indicated as "D2", the height from the point from which the reference outside light indicated by the solid line enters the internal surface of front window 3 to the user position at which the reference outside light indicated by the dash-dot-dot line arrives is indicated as "D3", the height from the user position at which the reference outside light indicated by the solid line arrives to the vertically lower end of the eye placement region indicated by the dash-dot-dot line is indicated as "D4", and the height from the vertically lower end of the eye placement region indicated by the dash-dot-dot line to the horizontal line is indicated as "D5". Also, the width from the point of intersection of the outer surface of the conventional light-transmissive member and the outer surface of light-transmissive member 33 to the end edge of light-transmissive member 33 on the user side is indicated as "L1", the width from the end edge of light-transmissive member 33 on the user side to the point from which the reference outside light indicated by the solid line enters the internal surface of front window 3 is indicated as "L2", and the width from the point from which the reference outside light enters front window 3 to the user is indicated as "L3".

In FIG. 5, the angle formed by the horizontal line and the internal surface of front window 3 on the vehicle chamber side is indicated as "d", the angle of an acute angle formed by the horizontal line that passes the point from which the reference outside light enters the conventional light-transmissive member and the reference outside light indicated by the dash-dot-dot line that enters the conventional light-transmissive member is indicated as "θ", the angle formed by the horizontal line that passes the point from which the reference outside light enters the conventional light-transmissive member and the outer surface (tangent line) of the conventional light-transmissive member is indicated as "a", and the angle formed by the horizontal line that passes the point from which the reference outside light enters the conventional light-transmissive member and reflected light of the reference outside light indicated by the dash-dot-dot line reflected at the conventional light-transmissive member is indicated as "θ+2a". Also, the width between the point from which the reference outside light indicated by the solid line enters light-transmissive member 33 and the point from which the reference outside light indicated by the dash-dot-dot line enters the conventional light-transmissive member is indicated as "ΔT". Also in FIG. 5, the angle formed by the horizontal line that passes the end edge of the outer surface of light-transmissive member 33 on first edge portion 41 side and the outer surface (tangent line on the point) from which the reference outside light indicated by the solid line enters light-transmissive member 33 is indicated as "g", the angle formed by reflected light of the reference outside light indicated by the dash-dot-dot line reflected at the conventional light-transmissive member and the line that is parallel in the vertical direction and that includes the point from which such light enters the internal surface of front window 3 is indicated as "c", and the angle formed by the reference outside light indicated by the dash-dot-dot line reflected at the internal surface of front window 3 and the line that is parallel in the vertical direction and that includes the point from which such reference outside light enters the internal surface of front window 3 is indicated as "c+2d".

In this case, the following relation expressions (1) through (6) are satisfied.

$$\tan(\theta + 2a) = D2/L2 \quad \text{Expression (1)}$$

$$\tan(c + 2d) = L3/D3 \quad \text{Expression (2)}$$

$$c = 90 - (\theta + 2a) \quad \text{Expression (3)}$$

-continued $$D3 = L3/\tan(c + 2d) = L3/\tan(90 - (\theta + 2a - 2d)) = L3 \times \tan(\theta + 2a - 2d) \quad \text{Expression (4)}$$

$$D4 = D3 \cdot D5 \quad \text{Expression (5)}$$

$$\Delta T = L1 \times (\tan(a) - \tan(g)) \quad \text{Expression (6)}$$

As described above, in the present embodiment, it is possible to reduce the curvature of curved portion 33*a* of light-transmissive member 33 compared to that of the conventional light-transmissive member. Stated differently, the present embodiment is capable of decreasing the entire height of light-transmissive member 33 compared to the conventional light-transmissive member. This prevents an increase in the size of display device 1 that includes light-transmissive member 33 of the present embodiment compared to a display device that includes the conventional light-transmissive member, and also prevents a decrease in the capability of mounting the light-transmissive member onto display device 1.

<Operation>

In display device 1 with the above configuration, image light emitted from image generator 20 enters and is reflected at first reflection mirror 31, and then enters second reflection mirror 32. The image light that enters second reflection mirror 32 is reflected at second reflection mirror 32 to enter and transmit through light-transmissive member 33, and is emitted from light-transmissive member 33 to enter front window 3. The entry of the image light into front window 3 enables the projection of the image onto front window 3.

Also, outside light that transmits through front widow 3 passes through opening 40*a* of opening portion 40 to enter light-transmissive member 33, regardless of whether the position of opening portion 40 is in the first position or the second position. The outside light that enters light-transmissive member 33 is reflected at light-transmissive member 33 and enters front window 3. The outside light that enters front window 3 is reflected to arrive at a lower position than the eye box of the user. By adjusting the position of opening portion 40 in accordance with the position of the eye box, it is possible to prevent light from arriving at the eye box of the user.

<Working Effects>

The following describes the working effects of display device 1 of the present embodiment.

For example, the conventional head-up display fails to take measures against stray light caused by outside light and against dust, dirt, etc. that enter from the opening. It is considered that the light-transmissive member provided in the opening of the head-up display improves the effects of dust prevention. However, the conventional head-up display can be improved upon in that the stray light caused the outside light reflected at the light-transmissive member arrives at the user's eyes.

In view of this, display device 1 according to the present embodiment is, as described above, display device 1 that projects an image onto a display medium (front window 3) of a mobile object (vehicle 2) for a user to view a virtual image. Such display device 1 includes: image generator 20 that generates the image and outputs image light representing the image to project the image onto the display medium; light-transmissive member 33 that is located in an optical path of the image light outputted, between the display medium and image generator 20; and opening portion 40 in which opening 40*a* is located and which is disposed movably between a first position and a second position in a traveling direction of the mobile object, the second position being located farther backward in the traveling direction of the mobile object than the first position. Also, opening portion 40 includes first edge portion 41 located on a forward side of opening portion 40 in the traveling direction of the mobile object and second edge portion 42 located on a backward side of opening portion 40 in the traveling direction of the mobile object. When display device 1 is mounted on the mobile object, a line connecting an upper end of first edge portion 41 and a lower end of second edge portion 42 is taken as a reference line, and outside light that passes along the reference line and enters light-transmissive member 33 is taken as reference outside light, the reference outside light for a case where opening portion 40 is in the first position arrives at a lower position, at least in part of the optical path after the reference outside light is reflected at light-transmissive member 33, than the reference outside light for a case where opening portion 40 is in the second position.

With this, it is possible to dispose light-transmissive member 33 in a position that faces opening 40*a*, thereby preventing the entry of dust and dirt from opening 40*a*.

It is also possible to displace the optical path after the reference outside light is reflected at light-transmissive member 33, by moving the position of opening portion 40. Stated differently, since it is possible to adjust the position of opening portion 40 so that outside light does not arrive at the user's eyes, the user is less likely to be bothered by glare caused by the outside light.

According to display device 1, it is possible to prevent the entry of dust and dirt to inside of display device 1 and take measures against stray light, in accordance with the eye position of the driver. This consequently prevents the stray light caused by the outside light from arriving at the user's eyes, thereby enabling the user to be less likely to be bothered by glare.

Also, in display device 1 according to the present embodiment, light-transmissive member 33 includes curved portion 33*a* that is curved upwards toward an opposite direction of the traveling direction.

With this, when opening portion 40 is in the second position, it is possible to cause the reference outside light to enter curved portion 33*a*. This enables the outside light to enter curved portion 33*a* so that the outside light arrives at a position that is lower than the eye box, when opening portion 40 is in the second position.

Also, in display device 1 according to the present embodiment, the reference outside light for the case where opening portion 40 is in the first position arrives at a lower position, after reflected at the display medium, than the reference outside light for the case where opening portion 40 is in the second position.

With this, when opening portion 40 is in the second position, it is possible to cause the outside light to arrive at a lower position than the position of the eye box, by moving opening portion 40 toward the first position, when the user is bothered by glare caused by the outside light. Stated differently, since it is possible to adjust the position of opening portion 40 so that the outside light does not arrive at the user's eyes, the user is less likely to be bothered by glare caused by the outside light.

Also, in display device 1 according to the present embodiment, the reference outside light for the case where opening portion 40 is in the first position arrives at a lower position than the reference outside light for the case where opening portion 40 is in the second position.

With this, it is possible to cause the outside light not to arrive at the user's eyes by moving opening portion 40 to the first position, even when a short person is on vehicle 2.

Also, in display device 1 according to the present embodiment, first edge portion 41 protrudes upwards with respect to light-transmissive member 33, and a tip of first edge portion 41 is located higher than light-transmissive member 33.

With this, it is possible to reduce the amount of outside light that enters light-transmissive member 33, by moving the position of opening portion 40. Stated differently, since first edge portion 41 blocks the outside light, it is possible to reduce the amount of the outside light that is taken inside of display device 1. This prevents the outside light that enters and transmits through light-transmissive member 33 from being collected and reaching inside of image generator 20, thus preventing a rise in the internal temperature of image generator 20. As a result, the deterioration of image generator 20 is prevented.

Also, in display device 1 according to the present embodiment, image generator 20 includes display 25 and a projector (light-emitting module 23).

With this, image generator 20 projects the image onto front window 3 by outputting the image light.

Variation of Embodiment 1

Display device 1 of the present variation is different from the display device of Embodiment 1 in that light-transmissive member 33 is provided in opening portion 140. The other elements in the present variation are the same as those of Embodiment 1 unless otherwise specified. Thus, the same reference signs are assigned to the same elements and detailed descriptions of the elements are omitted.

Figure 6:
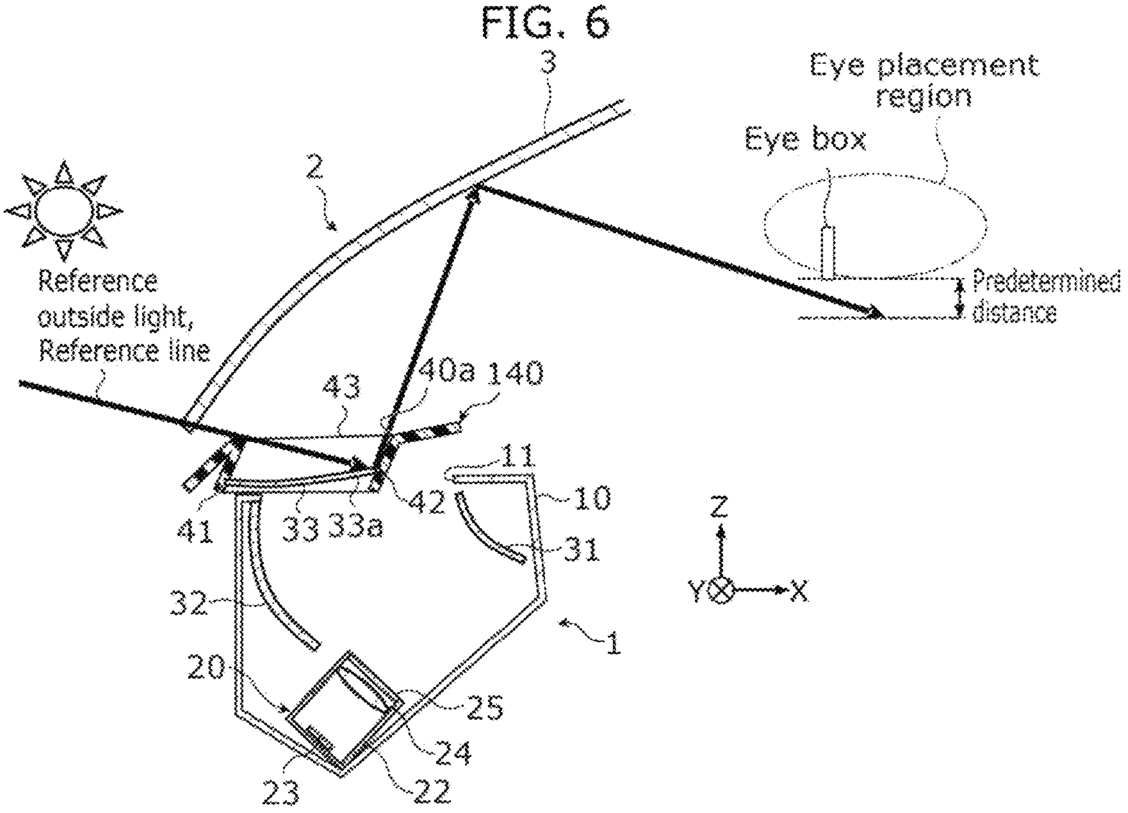
FIG. 6 is a cross-sectional view showing the internal configuration of a display device according to a variation of Embodiment 1 and a front window, when an opening portion of the display device is in the first position.
Figure 7:
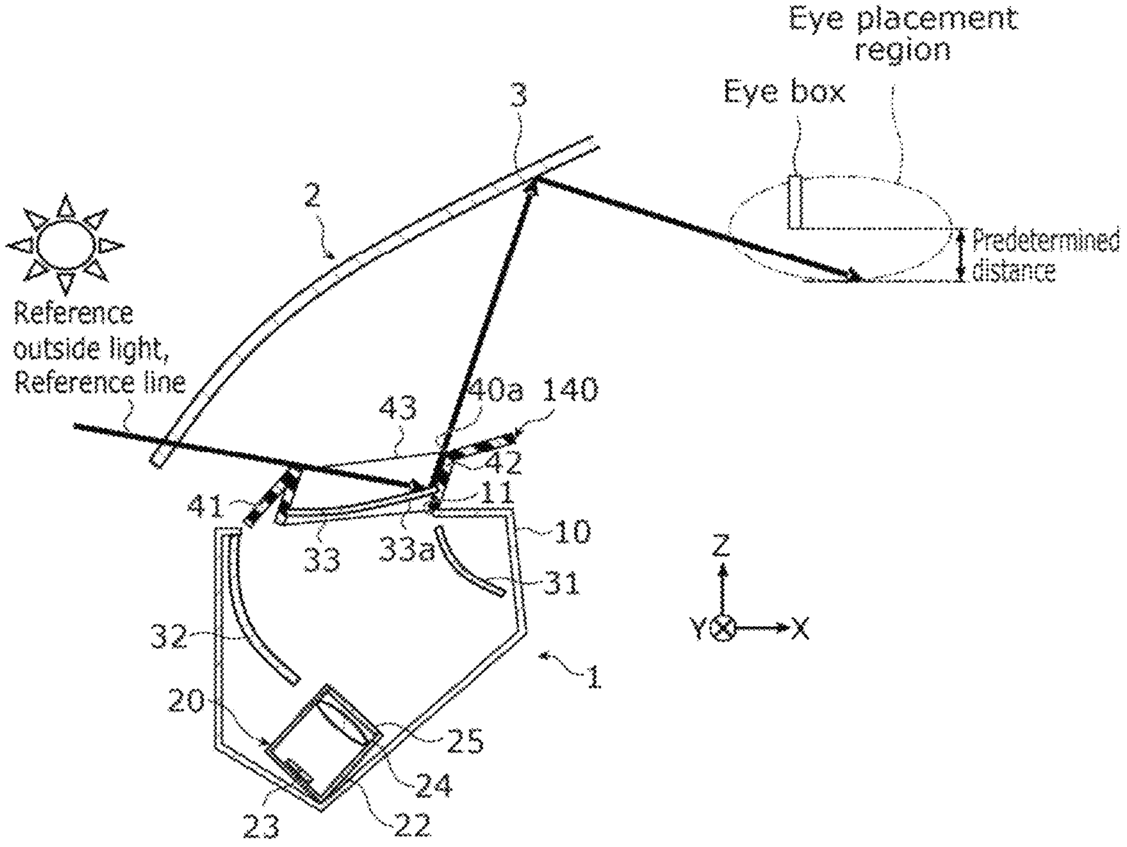
FIG. 7 is a cross-sectional view showing the internal configuration of the display device according to the variation of Embodiment 1 and the front window, when the opening portion of the display device is in the second position.

FIG. 6 is a cross-sectional view showing the internal configuration of display device 1 according to a variation of Embodiment 1 and front window 3, when opening portion 140 of display device 1 is in the first position. FIG. 7 is a cross-sectional view showing the internal configuration of display device 1 according to the variation of Embodiment 1 and front window 3, when opening portion 140 of display device 1 is in the second position.

As shown in FIG. 6 and FIG. 7, in display device 1 of the present variation, light-transmissive member 33 is connected to opening portion 140. More specifically, light-transmissive member 33 is disposed in opening portion 140 to cover the entirety of opening 40*a* of opening portion 140. For this reason, light-transmissive member 33 is movable along the traveling direction of vehicle 2 together with opening portion 140. In this case, another light-transmissive member may be or may not be disposed in housing opening 11 of first housing 10 of the present variation.

Also, light-transmissive member 33 is disposed in opening 40*a* in an orientation in which light-transmissive member 33 is curved upwards toward the opposite direction of the traveling direction. Stated differently, curved portion 33*a* of light-transmissive member 33 is coupled to second edge portion 42, and the part of light-transmissive member 33 that is opposite to curved portion 33*a* (the part on the negative X direction side) is coupled to first edge portion 41.

Here, the lower end of second edge portion 42 of the present embodiment is described. In the present embodiment, light-transmissive member 33 is disposed in opening portion 140. As such, a point of intersection of light-transmissive member 33 and a wall surface of second edge portion 42 may be taken as the lower end of second edge portion 42.

In display device 1 according to the present variation with the above configuration, light-transmissive member 33 is connected to opening portion 140 and movable along the traveling direction of the mobile object together with opening portion 140.

Also, since light-transmissive member 33 is provided in an integrated form with opening portion 140, it is possible to cause light-transmissive member 33 to move together with opening portion 140.

Embodiment 2

Display device 1 of the present embodiment is different from the display device of Embodiment 1 in that light-transmissive member 33 includes light guide plate 60. The other elements in the present embodiment are the same as those of Embodiment 1 unless otherwise specified. Thus, the same reference signs are assigned to the same elements and detailed descriptions of the elements are omitted.

<Configuration>

Figure 8A:
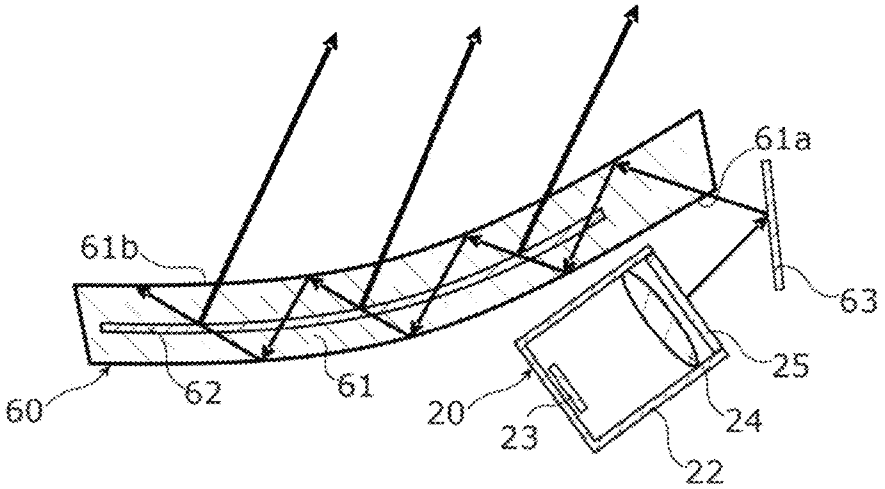
FIG. 8A is a cross-sectional view showing a display device according to Embodiment 2.
Figure 8B:
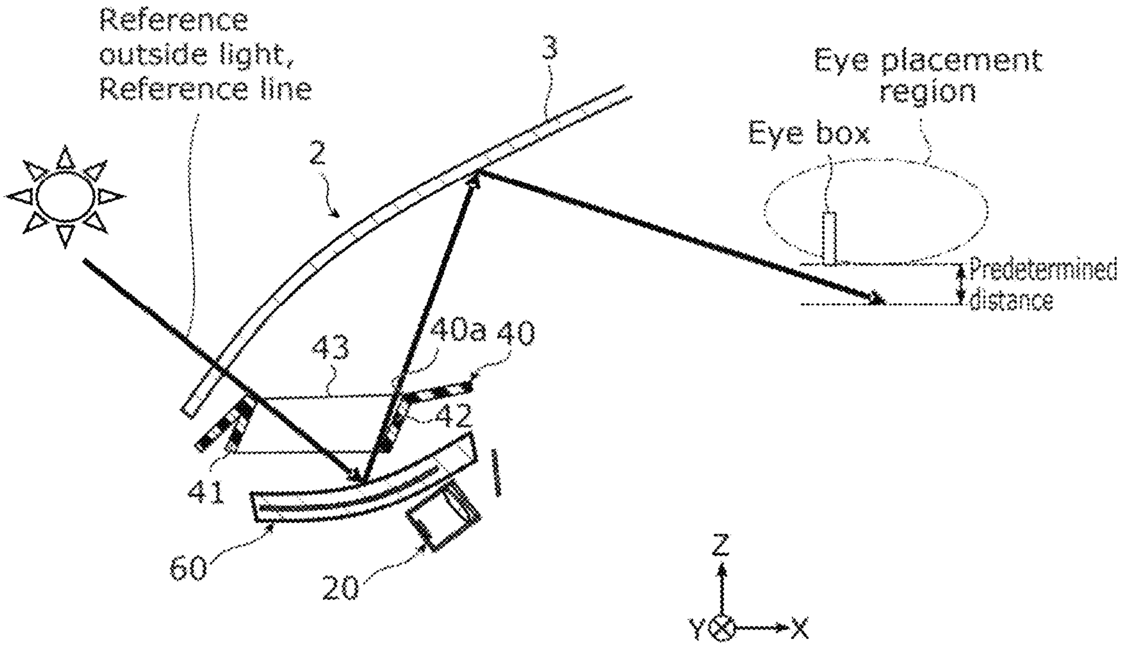
FIG. 8B is a cross-sectional view showing the display device according to Embodiment 2 and the front window.

FIG. 8A is a cross-sectional view showing display device 1 according to Embodiment 2. FIG. 8B is a cross-sectional view showing display device 1 according to Embodiment 2 and front window 3.

As shown in FIG. 8A, in display device 1 of the present embodiment, light-transmissive member 33 includes light guide plate 60 including output optical element 62 that displays a hologram image. Light guide plate 60 projects, onto front window 3, image light constituted by an image emitted from display 25 of image generator 20, thereby displaying a hologram image represented by the image light to the user.

More specifically, light guide plate 60 includes light guide body 61 and output optical element 62.

Light guide body 61 is an elongated plate that extends in a predetermined direction from light-entering surface 61*a*. Light guide body 61 includes light-entering surface 61*a* and light-outputting surface 61*b*.

Light-entering surface 61*a* is a surface from which image light reflected at reflection mirror 63 enters. Light-entering surface 61*a* is disposed to face reflection mirror 63. Light-entering surface 61*a* is part of the back surface of light guide plate 60, and serves as a surface on one end side of light guide plate 60. The back surface is the surface of light guide body 61 on image generator 20 side. Note that light-entering surface 61*a* may be a lateral surface of light guide plate 60, and thus is not limited to being the back surface of light guide body 61.

Light-outputting surface 61*b* emits, toward front window 3, the image light that enters from light-entering surface 61*a* and is guided inside of light guide body 60. Light-outputting surface 61*b* faces front window 3 with a predetermined distance therebetween. Light-outputting surface 61*b* is part of the outer surface of light guide body 61. The outer surface is the surface of light guide body 61 on front window 3 side.

Output optical element 62, which is embedded inside of light guide body 61, is a light-transmissive diffraction hologram having a plate shape. Output optical element 62 is disposed along the outer surface and the back surface of light guide body 61 that are in the longitudinal direction of light guide body 61.

Image light that has been reflected at reflection mirror 63 and entered from light-entering surface 61*a* enters output optical element 62. Every time the image light enters (transmits through) output optical element 62 from a predetermined direction, output optical element 62 diffracts the image light to cause some beams of the image light to be emitted from light-outputting surface 61*b* at a predetermined emission angle via light guide body 61. More specifically, some beams of the image light diffracted by output optical element 62 are emitted from light-outputting surface 61*b* via light guide body 61, and the remaining beams of the image light are guided through light guide body 61 to be diffracted by output optical element 62 and emitted from light-outputting surface 61*b*. The emission angle is a light emission angle with respect to the normal of the outer surface of output optical element 62.

Output optical element 62 also diverges the image light to be emitted to cause the beams of the image light to be emitted at mutually different emission angles in a predetermined region in output optical element 62. In diffracting the entering image light, output optical element 62 changes emission angles depending on the position (portion) on output optical element 62 where the image light is diffracted. With this, output optical element 62 changes emission angles for some beams of the image light diffracted by output optical element 62.

Light guide body 61 of the present embodiment is curved. For this reason, output optical element 62 is also curved. More specifically, light guide body 61 and output optical element 62 are curved upwards toward image generator 20. Also, the outer surface and the back surface of light guide body 61 are also curved surfaces.

Note that light guide plate 60 may be disposed, as the light-transmissive member, in the opening portion to cover the entirety of the opening of the opening portion. As such, light-transmissive member 33 may be movable along the traveling direction of vehicle 2 together with the opening portion. Light guide plate 60 may also be disposed in the housing opening of the first housing.

<Working Effects>

The following describes the working effects of display device 1 of the present embodiment.

As described above, in display device 1 according to the present embodiment, light-transmissive member 33 includes light guide plate 60 including output optical element 62 that displays a hologram image.

With this, it is possible to project a hologram image onto front window 3. This enables the user to view a stereoscopic image. Accordingly, by displaying information about the traveling of vehicle 2, the user can easily grasp the information about the traveling of vehicle 2, thus contributing to safe driving of vehicle 2.

Other Variations, Etc.

The present disclosure has been described above on the basis of the foregoing embodiments, but the present disclosure is not limited to these embodiments, and so forth.

Figure 9:
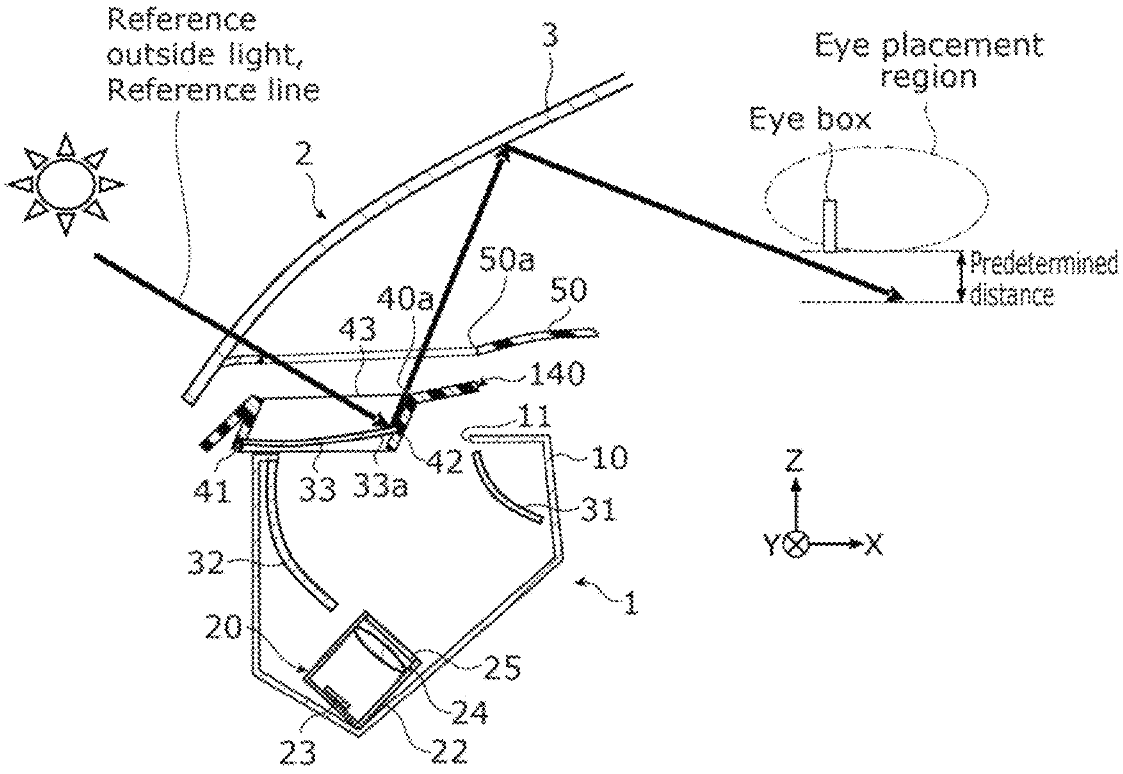
FIG. 9 is a cross-sectional view showing the internal configuration of a display device according to other variation and a front window, when an opening portion of the display device is in the first position.

For example, in display device 1 according to each of the foregoing embodiments, opening portion 40 may be disposed inside of dashboard 50 of vehicle 2, as shown in FIG. 9. FIG. 9 is a cross-sectional view showing the internal configuration of display device 1 according to other variations and front window 3, when opening portion 40 of display device 1 is in the first position. With this, light-transmissive member 33 and opening portion 140 are configured in an integral form, thereby preventing and reducing variations in the mounting of light-transmissive member 33 and opening portion 140. Also, since light-transmissive member 33 is disposed below dashboard 50, dashboard 50 blocks outside light that enters light-transmissive member 33 at a small angle. This maximizes the angle of an acute angle between the reference outside light and light-transmissive member 33. For this reason, the outside light arrives at a lower position in the user position than the user's eye position. As a result, the user is less likely to be bothered by glare.

Also, even when opening portion 40 is disposed inside of dashboard 50 as shown in FIG. 9, the angle of an acute angle formed by light-transmissive member 33 and the reference line for the case where opening portion 40 is in the first position may be greater than the angle of an acute angle formed by light-transmissive member 33 and the reference line for the case where opening portion 40 is in the second position. According to this, the angle of an acute angle formed by light-transmissive member 33 and the reference line for the case where opening portion 40 is in the first position is set to be greater than the angle for the case where opening portion 40 is in the second position. This enables the adjustment of the arrival position of the outside light reflected at front window 3, by moving the position of opening portion 40 to cause such outside light to arrive at a lower position than the position of the eye box of the user. For example, the reference outside light for the case where opening portion 40 is in the first position arrives at a lower position than the reference outside light for the case where opening portion 40 is in the second position, at least in part of the optical path after the reference outside light is reflected at light-transmissive member 33. Also, as the matter of fact, when a line that connects the edge portion of opening 50*a* of dashboard 50 on the negative X direction side and the lower end of second edge portion 42 is taken as a reference line, the angle of an acute angle formed by light-transmissive member 33 and such reference line for the case where opening portion 40 is in the first position may be greater than the angle of an acute angle formed by light-transmissive member 33 and the reference line for the case where opening portion 40 is in the second position.

Also, the display device according to each of the foregoing embodiments includes the opening portion as an element, but when the opening portion is included in the vehicle, the display device may be configured without the opening portion.

Also, in the display device according to each of the foregoing embodiments, the opening portion may include a lid that covers the opening of the opening portion and the light-transmissive member. Stated differently, by covering with the lid the entirety of the opening and the light-transmissive member when the display device is not in use, it is possible to prevent a rise in the internal temperature of the image generator caused by the entry of the outside light to inside of the display device.

In addition to the above, the present disclosure also includes an embodiment achieved by making various modifications to the embodiments that can be conceived by those skilled in the art and an embodiment achieved by freely combining elements and functions of the embodiments without departing from the essence of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-212545 filed on Dec. 27, 2021, and PCT International Application No. PCT/JP2022/043094 filed on Nov. 22, 2022.

INDUSTRIAL APPLICABILITY

The present disclosure is applicable for use in, for example, a mobile object such as a vehicle.

What is claimed is:

1. A display device that projects an image onto a display medium of a mobile object for a user to view a virtual image, the display device comprising:

an image generator that generates the image and outputs image light representing the image to project the image onto the display medium;

a light-transmissive member that is located in an optical path of the image light outputted, between the display medium and the image generator; and an opening portion in which an opening is located and which is disposed movably between a first position and a second position in a traveling direction of the mobile object, the second position being located farther backward in the traveling direction of the mobile object than the first position, wherein the opening portion includes a first edge portion located on a forward side of the opening portion in the traveling direction of the mobile object and a second edge portion located on a backward side of the opening portion in the traveling direction of the mobile object, and when the display device is mounted on the mobile object:

a line connecting an upper end of the first edge portion and a lower end of the second edge portion is taken as a reference line, and outside light that passes along the reference line and enters the light-transmissive member is taken as reference outside light, the reference outside light for a case where the opening portion is in the first position arrives at a lower position, at least in part of the optical path after the reference outside light is reflected at the light-transmissive member, than the reference outside light for a case where the opening portion is in the second position, and an angle of an acute angle formed by the light-transmissive member and the reference line for the case where the opening portion is in the first position is greater than an angle of an acute angle formed by the light-transmissive member and the reference line for the case where the opening portion is in the second position.

2. The display device according to claim 1, wherein the light-transmissive member includes a curved portion that is curved upwards toward an opposite direction of the traveling direction.

3. The display device according to claim 1, wherein the light-transmissive member is connected to the opening portion, and is movable along the traveling direction of the mobile object, together with the opening portion.

4. The display device according to claim 1, wherein the opening portion is disposed inside a dashboard of the mobile object.

5. The display device according to claim 1, wherein the first edge portion protrudes upwards with respect to the light-transmissive member, and a tip of the first edge portion is located higher than the light-transmissive member.

6. The display device according to claim 1, wherein the image generator includes a display and a projector.

7. The display device according to claim 1, wherein the light-transmissive member includes a light guide plate including an output optical element that displays a hologram image.

8. A display device that projects an image onto a display medium of a mobile object for a user to view a virtual image, the display device comprising:

an image generator that generates the image and outputs image light representing the image to project the image onto the display medium;

a light-transmissive member that is located in an optical path of the image light outputted, between the display medium and the image generator; and an opening portion in which an opening is located and which is disposed movably between a first position and a second position in a traveling direction of the mobile object, the second position being located farther backward in the traveling direction of the mobile object than the first position, wherein the opening portion includes a first edge portion located on a forward side of the opening portion in the traveling direction of the mobile object and a second edge portion located on a backward side of the opening portion in the traveling direction of the mobile object, and when the display device is mounted on the mobile object:

a line connecting an upper end of the first edge portion and a lower end of the second edge portion is taken as a reference line, and outside light that passes along the reference line and enters the light-transmissive member is taken as reference outside light, the reference outside light for a case where the opening portion is in the first position arrives at a lower position, at least in part of the optical path after the reference outside light is reflected at the light-transmissive member, than the reference outside light for a case where the opening portion is in the second position, and the reference outside light for the case where the opening portion is in the first position arrives at a lower position, after reflected at the display medium, than the reference outside light for the case where the opening portion is in the second position.

9. A display device that projects an image onto a display medium of a mobile object for a user to view a virtual image, the display device comprising:

an image generator that generates the image and outputs image light representing the image to project the image onto the display medium;

a light-transmissive member that is located in an optical path of the image light outputted, between the display medium and the image generator; and an opening portion in which an opening is located and which is disposed movably between a first position and a second position in a traveling direction of the mobile object, the second position being located farther backward in the traveling direction of the mobile object than the first position, wherein the opening portion includes a first edge portion located on a forward side of the opening portion in the traveling direction of the mobile object and a second edge portion located on a backward side of the opening portion in the traveling direction of the mobile object, and when the display device is mounted on the mobile object:

a line connecting an upper end of the first edge portion and a lower end of the second edge portion is taken as a reference line, and outside light that passes along the reference line and enters the light-transmissive member is taken as reference outside light, the reference outside light for a case where the opening portion is in the first position arrives at a lower position, at least in part of the optical path after the reference outside light is reflected at the light-transmissive member, than the reference outside light for a case where the opening portion is in the second position, and the reference outside light for the case where the opening portion is in the first position arrives at a lower position, in a position of the user, than the reference outside light for the case where the opening portion is in the second position.

* * * * *